United States Patent

[11] 3,631,734

| [72] | Inventor | Donald E. Wagner<br>Peoria, Ill. |
|---|---|---|
| [21] | Appl. No. | 40,828 |
| [22] | Filed | May 27, 1970 |
| [45] | Patented | Jan. 4, 1972 |
| [73] | Assignee | Caterpillar Tractor Co.<br>Peoria, Ill. |

[54] SELF-ADJUSTING BELT TIGHTENER
12 Claims, 3 Drawing Figs.

[52] U.S. Cl. .................................................. 74/242.11 R,
    74/242.15 R
[51] Int. Cl. .................................................. F16h 7/12,
    F16h 7/10
[50] Field of Search ........................................ 74/242.11
    R, 242.11 C, 242.15 R

[56] References Cited
UNITED STATES PATENTS

| 3,515,010 | 6/1970 | Wagstaff et al. ............... | 74/242.15 X |
| 1,852,768 | 4/1932 | Carden .......................... | 74/242.15 |
| 2,456,088 | 12/1948 | Scircle ........................... | 74/242.15 |

*Primary Examiner*—Leonard H. Gerin
*Attorney*—Fryer, Tjensvold, Feix, Phillips & Lempio

ABSTRACT: An arrangement for positioning a tensioning member, such as the drive pulley of an alternator or generator associated with an engine assembly, against a flexible continuous drive means, such as a drive belt, to automatically maintain the drive means in a tightened position. The arrangement includes spring means for resiliently urging the tensioning member against the drive means in a direction to cause tensioning thereof, and stop means for preventing movement of the tensioning member in opposition to the spring force while permitting movement in the tensioning direction.

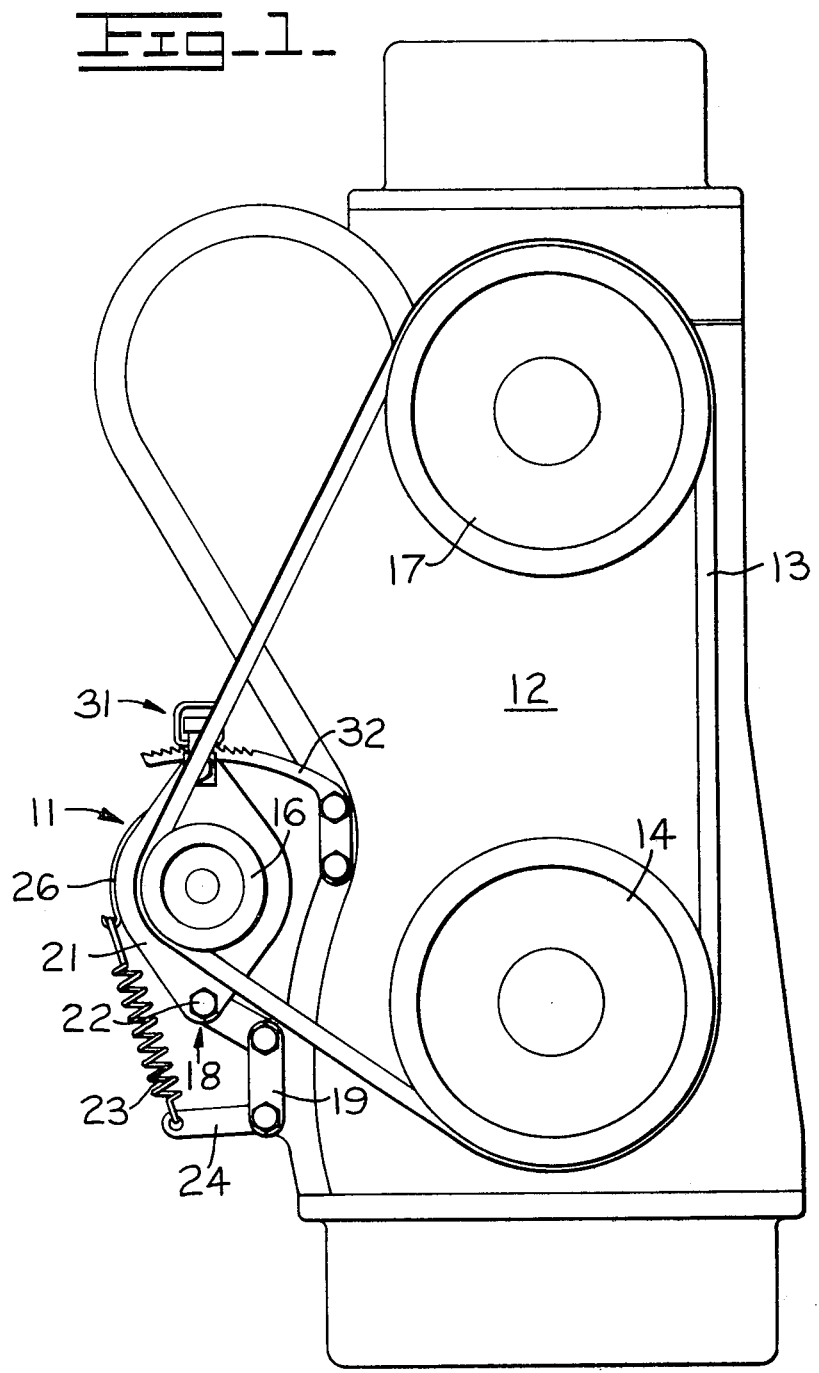

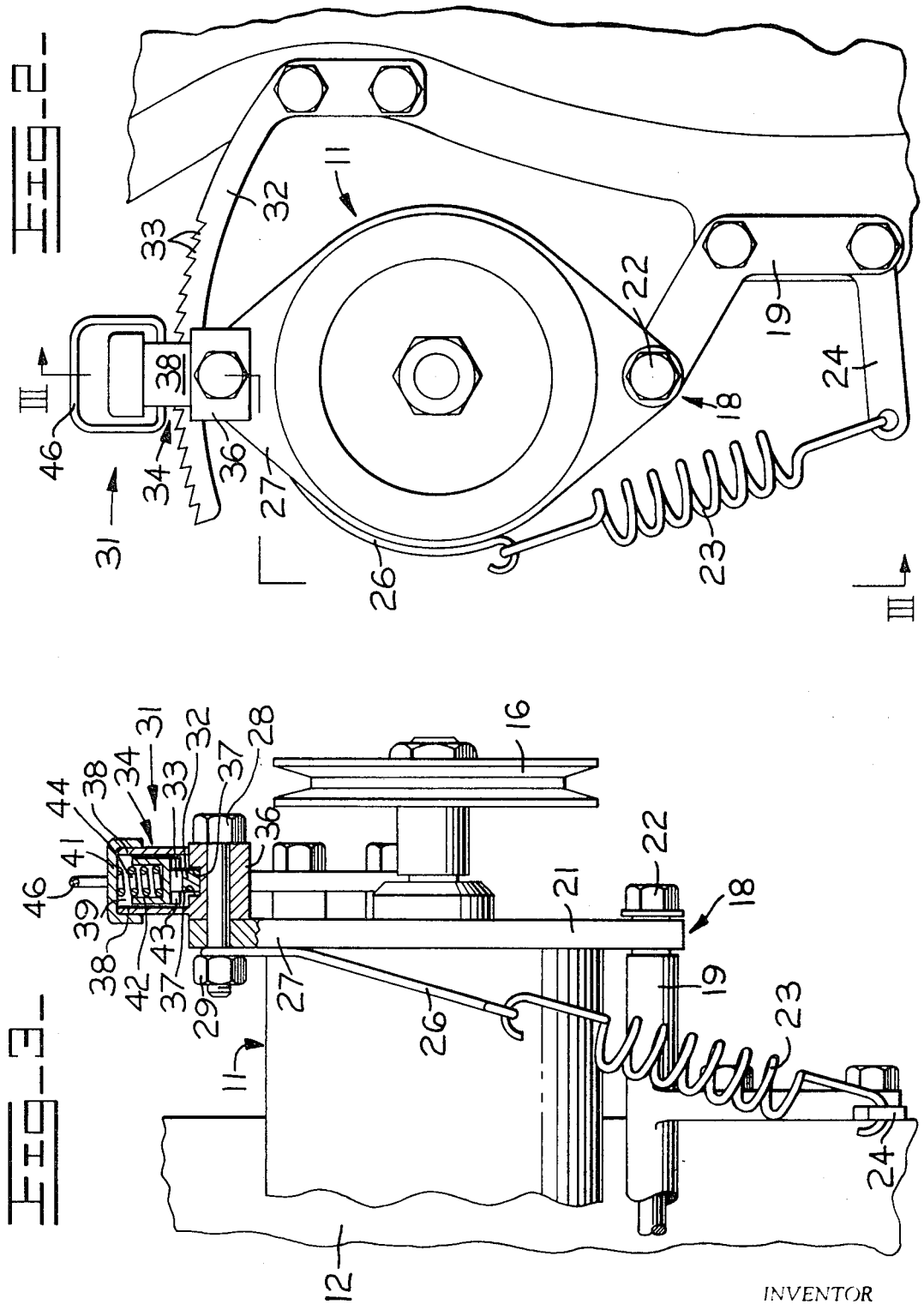

SELF-ADJUSTING BELT TIGHTENER

BACKGROUND OF THE INVENTION

On various engines, the generator or alternator drive pulley is utilized as a tightener or tensioning member for the drivebelt utilized as a drive means for the generator, fan, air compressors, and the like. In this regard, the generator frame is usually pivoted about a connection with the engine while an opposite portion of the frame is slidable on a strap rigidly secured to the engine.

To tighten the drivebelt extending about the generator drive pulley, the generator is moved outwardly about its pivot point to urge the pulley against the belt until the belt is tight. The generator is then secured to the strap in belt tightened position by tightening a lock bolt, or the like.

While such conventional means of tightening is satisfactory in many cases, there are engine applications where limited space or obstructions do not permit convenient tightening of the belt once it begins to lengthen from use. A loose belt allows slippage between it and the pulleys resulting in inefficient performance of the belt-driven components.

In order to obviate the belt-tightening problem, various self-adjusting tightener arrangements have been heretofore devised which typically employ a spring to restrain the generator pulley, or other tightener component in an outward position against the belt to maintain tension thereon. When a spring is used, the portion of the generator frame opposite its pivot point is permitted to slide relative to the strap in response to the opposed forces acting on the generator due to the belt and spring.

Such self-adjusting tighteners have generally proven unsatisfactory by virtue of the forces produced by flexing of the belt during engine operation which tend to pull the generator inward, while the spring attempts to compensate by urging the generator outward, thereby resulting in an oscillating action which is detrimental to belt life. Although shock absorber mechanism might be employed to damp the detrimental oscillations, it is difficult to adapt such mechanism to the belt-tightening arrangement because of the limited available space.

SUMMARY OF THE INVENTION

The general object of the present invention is to provide a self-adjusting belt tightener which does not subject the belt to oscillations detrimental to belt life, and yet is of simple compact design.

In the accomplishment of the foregoing and other objects and advantages, a self-adjusting belt tightener in accordance with the present invention generally includes spring means for resiliently urging a pivoted tensioning member, such as a generator and its associated drive pulley, against a drivebelt or equivalent continuous drive means, in a direction to effect tensioning thereof.

A pawl carried by the tensioning member interacting with rack defining teeth of a fixed strap, or equivalent stop means, are effective to prevent movement of the tensioning member in a direction opposite that due to the force exerted by the spring means, while being permissive to movement in the tensioning direction. The stop means consequently prevents the forces generated by flexing of the belt from acting on the spring means and establishing an oscillatory condition.

The tensioning member is restrained in a stationary position until the belt begins to loosen, at which time the spring means moves the tensioning member to a new tensioning position until the belt begins to loosen, at which time the spring means moves the tensioning member to a new tensioning position determined by the stop means. The stop means are preferably selectively releasable to permit manual movement of the tensioning member when desired, as in the installation of a new belt.

BRIEF DESCRIPTION OF THE DRAWINGS

FIG. 1 is a front elevation view of an engine with a generator driven through a belt-drive and including a self-adjusting belt tightener arrangement in accordance with the invention.

FIG. 2 is a fragmentary front elevation view on an enlarged scale of the generator and belt-tightener arrangement.

FIG. 3 is a sectional view taken at line III—III of FIG. 2.

DETAILED DESCRIPTION OF THE PREFERRED EMBODIMENT

The arrangement of the present invention is equally suitable for self-adjustment of the tensioning position of a tensioning or tightening member associated with any flexible continuous drive means such as a belt or chain. However, referring to FIGS. 1–3, the invention is hereinafter described in detail with reference to a belt-driven generator 11 associated with an engine, the block of which is indicated at 12. Driving power is supplied to the generator from the engine through a drive belt 13.

More particularly, the belt is continuous and passes over an engine drive pulley 14, generator drive pulley 16, and the pulleys associated with other driven components, for example fan pulley 17.

The generator pulley 16 is movable with respect to the drivebelt by pivoting the generator about a connection 18 between a bracket 19 secured to the engine block 12 and a flange 21 of the generator frame. The connection 18 preferably includes a bolt 22 passing through the generator flange and the bracket, and a nut (not shown) threadably engaging the bolt. Thus, the generator may be pivoted outwardly with respect to the block to urge the generator pulley against the belt and thereby apply tensioning force to same. In this manner, the generator pulley serves as a belt-tensioning member.

In order that the generator pulley 16 apply self-adjusting tensioning force to the belt, spring means are provided to resiliently urge the generator 11 about its pivot connection 18 outwardly from the block, i.e., in a direction to produce tension in the belt. In this regard, a spring 23 is secured at one end to a lug 24 projecting from the bracket 19, and at the other end to a band 26 secured to a flange 27 of the generator frame diametrically opposite the pivot flange 21 by means of a bolt 28 and nut 29. The spring thus acts on the upper portion of the generator frame to pivot it outwardly about the pivot connection 18.

It will be appreciated that although the spring 23 facilitates self-adjusting tensioning of the belt 13, the forces produced by flexing of the belt during engine operation would normally tend to pull the generator 11 inwardly against the spring force in which case the spring attempts to compensate by moving the generator outwardly. An oscillating action would thus be normally established which is detrimental to belt life.

However in accordance with the particularly salient aspects of the present invention, stop means 31 are provided in cooperation with the spring means to prevent movement of the generator in opposition to the spring force while permitting movement in the direction of the spring force to retain the desired self-adjusting tensioning of the belt 13. By virtue of the stop means preventing movement in opposition to the spring force, establishment of the undesirable oscillating action is precluded.

More particularly, the stop means 31 preferably includes an arcuate strap 32 secured at one end to the engine block 12 to project outwardly therefrom in spaced opposition to the pivot connection 18 of the generator 11. The radius of curvature of the strap is centered at the pivot connection.

The upper edge of the strap is serrated to define a plurality of teeth 33 which thereby form a rack. The teeth are preferably of right-triangular configuration with the trailing edge of each tooth relative to the engine block being disposed radially of the strap and therefore of the pivot connection. The hypotenuse edge of each tooth is then the leading edge thereof relative to the engine block and forwardly terminates abruptly in the trailing edge of the next inwardly adjacent tooth.

The strap 32 extends through a housing 34 secured to the flange 27 of generator 11. The housing preferably includes a base block 36 traversed by the bolt 28 to facilitate securance of the housing to the flange. The upper surface of the block is formed with a groove 37 for slidably receiving the lower edge of the strap, and a pair of parallel spaced sidewalls 38 project upwardly from the block in outwardly spaced parallel relation to the opposite side faces of the strap.

A pair of parallel spaced end walls 39 project upwardly from the block in right-angular bridging relation to the sidewalls 38, such end walls being provided with openings coextensive with the groove 37 to permit traversal by the strap. A cap 41 is secured to the upper edges of the side and end walls in closing relation thereto.

The stop means 31 further include a pawl 42 mounted for slidable translation within the housing 34. The pawl is provided with teeth 43 complementary to and engageable with the rack defining teeth 33 of the strap 32. The pawl is resiliently urged downwardly as by means of a spring 44 extending between the pawl and the cap 41 to thereby normally engage the pawl teeth 43 with the rack teeth 33.

By virtue of the configuration of the teeth, pivotal movement of the generator 11 inwardly towards the engine block 12 is prevented by locking of the teeth. In this regard, the radial trailing edges of the rack teeth are lockingly engaged by the complementary leading edges of the pawl teeth to thereby restrain the generator from being pulled inward due to flexing of the belt 13 which exerts force on the generator in opposition to the outwardly directed self-tightening force of the spring 23. However, pivotal movement of the generator outwardly under the influence of the spring force is permitted by the pawl and rack arrangement.

More particularly, during outward pivotal movement of the generator, the pawl yields against its loading spring 44 as the inclined hypotenuse trailing edges of the pawl teeth ride upwardly over the complementary leading edges of the rack teeth. Upon riding over the leading edges of the rack teeth, the pawl teeth are urged downwardly by spring 44 into locked engagement with the trailing edges of these rack teeth, thereby preventing inward pivotal movement of the generator.

With the self-adjusting belt-tightening arrangement physically described hereinbefore, it will be appreciated that the belt 13 is automatically maintained in tightened position about the pulleys of belt-driven components thereby eliminating slippage and providing efficient component performance.

More particularly, the generator 11 is pivoted outwardly by the spring 28 to urge the generator pulley 16 against the belt with a force directed to tension the latter. The pawl and rack stop means 31 function in the manner previously described to prevent inward pivotal movement of the generator in opposition to the tensioning spring force. The stop means restrain the generator in stationary belt tightening position until the belt begins to loosen. At this time the spring 23 moves the generator outwardly to a new stationary tensioning position, the stop means permitting such movement in the tensioning direction. In this manner, the spring is permitted to act in only one direction, thereby preventing detrimental oscillatory movement of the generator which would occur if the spring was permitted to oppose the forces due to flexing of the belt.

In order to facilitate manual tightening of the belt 13 when desired, for example in the initial adjustment of the belt or when installation of a new belt becomes necessary, provision is made for the convenient release of the stop means 31 to permit inward pivotal movement of the generator 11. In this regard, there is preferably provided a bail 46 passing through vertical slots in opposed walls of the housing 34, for example end walls 39, into connection with the pawl 42. Thus, pulling the bail upwardly disengages the pawl teeth 43 from the rack teeth 33, thereby permitting movement of the generator in either direction.

The generator may be manually moved outwardly to permit the placement of tension on the belt. When sufficient tension is obtained, the bail is released to permit the loading spring 44 to engage the pawl teeth with the rack teeth, whereupon self-adjusting tensioning is resumed in the manner previously described.

Although the invention has been hereinbefore described and illustrated in the accompanying drawings with respect to a single preferred embodiment, various modifications and changes may be made therein without departing from the true spirit and scope of the invention, and thus it is not intended to limit the invention except by the terms of the appended claims.

What is claimed is:

1. An arrangement for positioning a pivoted tensioning member against a flexible continuous drive means to automatically maintain same in tightened position comprising spring means coupled to said tensioning member for resiliently pivotally urging same against said drive means in a direction to effect tensioning thereof, and positive stop means interacting with said tensioning member for preventing movement thereof in opposition to the force of said spring means while being permissive to movement in the tensioning direction.

2. An arrangement according to claim 1, further defined by said stop means comprising a fixed strap disposed in opposition to the pivot point of said tensioning member and having teeth defining a rack, and a pawl carried by said tensioning member at a point diametrically opposite said pivot point and having teeth engaging the teeth of said rack.

3. An arrangement according to claim 1, further defined by said stop means being selectively releasable to permit manual movement of said tensioning member in opposition to the force of said spring means.

4. An arrangement according to claim 2, further defined by said strap being arcuate and having a radius of curvature centered at said pivot point of said tensioning member, said rack defining teeth being of right-triangular configuration with each tooth having a trailing edge with respect to a direction opposite said tensioning direction disposed radially of said strap and a hypotenuse leading edge, said pawl teeth being complementary to said rack defining teeth to lock against said trailing edges thereof and ride over said leading edges thereof.

5. An arrangement according to claim 4, further defined by said pawl being selectively disengageable from said rack.

6. An arrangement according to claim 4, further defined by a housing carried by said tensioning member at said point diametrically opposite said pivot point, said strap extending through said housing, said pawl mounted for slidable translation within said housing, and a spring disposed within said housing resiliently loading said pawl into engagement with said rack.

7. An arrangement according to claim 6, further defined by a bail passing through slots in opposed walls of said housing into connection with said pawl to facilitate pulling thereof against the loading of said spring to disengage the pawl from said rack.

8. An arrangement according to claim 1, further defined by said tensioning member being a belt-driven generator pivotally connected to an engine block, said drive means being a drive belt extending about a drive pulley of said block and a drive pulley of said generator, said spring means comprising a spring secured between said block and a point of said generator diametrically opposed to the pivot connection thereof to resiliently pivot said generator outwardly from said block and urge the pulley of said generator against said belt to apply tensioning force thereto, said stop means being effective to restrain pivotal movement of said generator inwardly towards said block while permitting pivotal movement outwardly therefrom.

9. An arrangement according to claim 8, further defined by said stop means comprising an arcuate strap end secured to said block to project outwardly therefrom in diametric opposition to said pivot connection of said generator and having a radius of curvature centered thereat, said strap having teeth defining a rack, and a pawl carried by said generator at said point diametrically opposite said pivot connection, said pawl having teeth engaging said rack teeth.

10. An arrangement according to claim 9, further defined by said rack teeth being of right-triangular configuration with each tooth having a trailing edge with respect to the engine block disposed radially of said strap and a hypotenuse leading edge, said pawl teeth being complementary to said rack teeth.

11. An arrangement according to claim 10, further defined by a housing carried by said generator at said point diametrically opposite said pivot connection, said strap slidably extending through said housing, said pawl mounted for slidable translation within said housing, and a spring disposed within said housing to act between said housing and said pawl to resiliently urge the latter into engagement with said rack.

12. An arrangement according to claim 11, further defined by a bail passing through slots in opposed walls of said housing into connection with said pawl to facilitate pulling thereof against the pawl loading spring to disengage said pawl from said rack.

* * * * *